(12) United States Patent
Bashir et al.

(10) Patent No.: US 8,117,496 B2
(45) Date of Patent: Feb. 14, 2012

(54) DETECTING AND RECOVERING FROM SILENT DATA ERRORS IN APPLICATION CLONING SYSTEMS

(75) Inventors: Ahmed M. Bashir, San Jose, CA (US); Prasenjit Sarkar, San Jose, CA (US); Soumitra Sarkar, Cary, NC (US); Mark J. Seaman, San Jose, CA (US); Dinesh K. Subhraveti, Milpitas, CA (US); Victor S. Wen, Berkeley, CA (US)

(73) Assignee: International Business Machines Corporation, Armonk, NY (US)

( * ) Notice: Subject to any disclaimer, the term of this patent is extended or adjusted under 35 U.S.C. 154(b) by 157 days.

(21) Appl. No.: 12/486,973

(22) Filed: Jun. 18, 2009

(65) Prior Publication Data

US 2010/0325500 A1 Dec. 23, 2010

(51) Int. Cl.
*G06F 11/00* (2006.01)
(52) U.S. Cl. .......................................... 714/12; 714/11
(58) Field of Classification Search ............. 714/11, 714/12
See application file for complete search history.

(56) References Cited

U.S. PATENT DOCUMENTS

| | | | |
|---|---|---|---|
| 5,692,121 A * | 11/1997 | Bozso et al. .................. 714/13 |
| 6,718,494 B1 | 4/2004 | Jamil et al. |
| 6,931,576 B2 | 8/2005 | Morrison et al. |
| 7,024,594 B2 * | 4/2006 | Pignol ............................ 714/54 |
| 7,051,155 B2 | 5/2006 | Talagala et al. |
| 7,062,704 B2 | 6/2006 | Talagala et al. |
| 7,103,811 B2 | 9/2006 | Talagala et al. |
| 7,117,422 B2 | 10/2006 | Duncan et al. |
| 7,308,605 B2 * | 12/2007 | Jardine et al. .................. 714/11 |
| 7,308,607 B2 | 12/2007 | Reinhardt et al. |
| 7,340,643 B2 * | 3/2008 | Grochowski et al. ........... 714/11 |
| 7,562,264 B2 * | 7/2009 | Tangvald et al. ............... 714/49 |
| 2002/0144176 A1 * | 10/2002 | Smith ............................ 714/11 |
| 2007/0106925 A1 | 5/2007 | Moore et al. |
| 2007/0150795 A1 | 6/2007 | King et al. |
| 2008/0208923 A1 * | 8/2008 | Watanabe et al. ............. 707/202 |

OTHER PUBLICATIONS

Lu et al. "CARP: Handling silent data errors and site failures in an integrated program and storage replication mechanism." 2009 29th IEEE Intl Conf on Distributed Computing Systems.*
Bartlet et al., "Commercial Fault Tolerance: A Tale of Two Systems," IEEE Transactions on Dependable and Secure Computing," Jan. 2004.

(Continued)

*Primary Examiner* — Philip Guyton
(74) *Attorney, Agent, or Firm* — Lieberman & Brandsdorfer, LLC

(57) ABSTRACT

A method, system, and article for resolving a silent error is disclosed. A primary program copy runs on a primary host, and a secondary program copy runs on a secondary host. The primary and secondary copies communicate to maintain synchronized execution. A third copy of the data is stored on a storage device as a write operations log and maintained in memory on the primary host while the program is running. The primary copy is synchronized with the secondary copy by computing a first checksum of data on the primary host in response to a read operation local to the primary host, computing a second checksum of data on the secondary host in response to a read operation local to the secondary host, and periodically communicating the first checksum to the secondary host, and resolving any discrepancies between the first and second checksum of data reflecting a silent data error.

22 Claims, 9 Drawing Sheets

OTHER PUBLICATIONS

Cully et al., "Remus: High Availability via Asynchronous Virtual Machine Replication," NSDI, 2008.
Pinheiro et al., "Failure Trends in a Large Disk Drive Population," FAST, 2007.
Bairavasundaram et al., "An Analysis of Latent Sector Errors in Disk Drives," SIGMETRICS, 2007.
Bairavasundaram et al., "An Analysis of Data Corruption in the Storage Stack," FAST, 2008.
Ranzer-Steindel, "Data Integrity," CERN IT Group, 2007.
Bergheaud et al., "Fault Tolerance in Multiprocessor Systems Via Application Cloning," ICDCS, 2007.
Basile et al., "A preemptive Deterministic Scheduling Algorithm for Multithreaded Replicas," DSN, 2003.
Russinovich et al., "Replay for Concurrent Non-deterministic Shared-Memory Applications," PLDI, 1996.
Orcutt, Data Replication Strategy, 2005, Sun Microsystems White Paper.
"Reliable Scalable Cluster Technology (RSCT)," www.redbooks.ibm.com/abstract/tips0090.html?Open.
"PostgreSQL," http://www.postgresql.org.
"The Apache HTTP Server Project," http://httpd.apache.org.
Mosberger, "httpperf: A tool for measuring web server performance," Performance Evaluation Review, 1998.
Castro et al., Practical Byzantine Fault Tolerance, OSDI, 1999.
Evans, "Information Technology—SCSI Block Commands-3 (SBC-3)," http://www.t10.org/cgi-bin/ac.pl?t=f&f=sbc3r17.pdf, 2008.
Hafner et al., Undetected Disk Errors in RAID Arrays, IBM Journal of Research and Development, vol. 52, 2008.
Dietz et al., "The Benefits of Enabling Fallback in the Active Data Warehouse," www.teradata.com/tdmo/v07n01/pdf/AR5201.pdf, 2007.
Bonwick, ZFS, LISA, 2007.
Ghemawat et al., The Google File System, SOSP, 2003.

* cited by examiner

DETECTING AND RECOVERING FROM SILENT DATA ERRORS IN APPLICATION CLONING SYSTEMS

BACKGROUND

1. Field of the Invention

This invention relates to silent data errors in a storage system. More specifically, the invention relates to a storage replication system, and detecting and recovering from silent data errors.

2. Background of the Invention

Service downtime is one of the major reasons for revenue loss in enterprises and is typically addressed by providing redundant software and hardware. One solution is to provide software redundancy and to mirror the state of a running program to a set of replicas such that, in case of a failure, one of the replicas assumes the place of the previously running application instance. This provides the paradigm of continuously available replica programs, where a replica can take over the functionality of a failed instance without service downtime. In addition, this solution avoids the cost of starting a new application instance on a different machine.

In the event of a site failure, the program as well as its underlying storage has to be available in a different site so that it can continue execution. Moreover, program and storage replication for continuous availability cannot be implemented by separately leveraging program replication and storage replication, where the latter is implemented using synchronous storage replication across two storage systems, or via synchronous logical volume manager mirroring.

In an integrated storage replication environment, two types of storage errors need to be handled to prevent replica divergence, including hard errors and silent data errors. Hard errors, including complete disk failures and latent sector errors, are those caused by mechanical characteristics of hard disk drives. Silent data errors represent a class of errors where the read data returned by the storage system does not match the data that was last written to the same disk address, but the error is undetected at the disk drive layer. Hard errors are detectable and recovery employs standard program replication techniques. However, silent data errors are not detected by conventional protection techniques. Traditional program replication techniques assume shared storage and do not handle silent data errors, and the execution of a program replica which operates on corrupted data will eventually diverge from other copies. Accordingly, if undetected, corrupted data emanating from a silent data error can contaminate the program state.

BRIEF SUMMARY

This invention comprises a method, system, and article for detecting and resolving silent data errors in a computer system in the context of a program replication system for providing continuous application availability.

In one aspect of the invention, a method is provided for resolving a silent data error. A primary copy of a program executes on a primary host. Similarly, a secondary copy of the program executes on a secondary host. The primary copy of the program reads and writes data to a primary storage device, and the secondary copy of the program reads and writes data to a secondary storage device, where the primary and secondary storage devices are local to the sites where the corresponding programs are executing. Communication between the primary and secondary copies is maintained to support synchronized execution of the copies. In addition, a third copy of the data, used to identify the correct copy of data when a silent data error is detected, is stored on the primary storage device as a write operations log and is maintained in memory on the primary host while the program is running.

Synchronization of the primary copy with the secondary copy includes: computing a first checksum of data on the primary host in response to a read operation local to the primary host; computing a second checksum of data on the secondary host in response to a read operation local to the secondary host; periodically communicating the first checksum to the secondary host, and resolving any discrepancies between the first and second checksum of data reflecting a silent data error; and detecting incorrect content in one of the copies due to the silent data error using the third copy of data.

In another aspect of the invention, a computer system is provided with a primary copy of a program configured to run on a primary processor of a primary host, and a secondary copy of the program configured to run on a secondary processor of a secondary host. The primary copy of the program reads and writes data to a primary storage device, and the secondary copy reads and writes data to a secondary storage device. Synchronized execution of the primary and secondary copies is maintained. A third copy of the data, for correcting silent data errors, is stored on the primary storage device as a write operations log and is maintained in the memory on the primary host while the program is running. A manager is provided to synchronize the primary copy with the secondary copy. The manager is configured to: compute a first checksum of data on the primary host in response to a read operation local to the primary host, compute a second checksum of data on the secondary host in response to a read operation local to the secondary host, to periodically communicate the first checksum to the secondary host, and to resolve any discrepancies between the first and second checksum of data indicative of a silent data error; and to detect incorrect content in at least one of the copies due to the silent data error.

In yet another aspect of the invention, an article is provided with a primary copy of a program running on a primary host, and a secondary copy of the program running on a second host. The primary copy of the program reads and writes data to a primary storage device, and the secondary copy reads and writes data to a secondary storage device. The primary copy and the secondary copy communicate to maintain synchronized execution of the copies. A third copy of the data is stored on the primary storage device as a write operations log and is maintained in memory on the primary host while the program is running. A computer readable carrier including computer program instructions is provided and configured to synchronize the primary copy with the secondary copy. The instructions include: instructions to compute a first checksum of data on the primary host in response to a read operation local to the primary host; instructions to compute a second checksum of data on the secondary host in response to a read operation local to the secondary host; instructions to periodically communicate the first checksum to the secondary host, and to resolve any discrepancies between the first and second checksum of data reflecting a silent data error; and instructions to detect incorrect content in at least one of the copies due to the silent data error.

Other features and advantages of this invention will become apparent from the following detailed description of the presently preferred embodiment of the invention, taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments of the invention, and not of all embodiments of the invention unless otherwise explicitly indicated. Implications to the contrary are otherwise not to be made.

DETAILED DESCRIPTION

Figure 1:
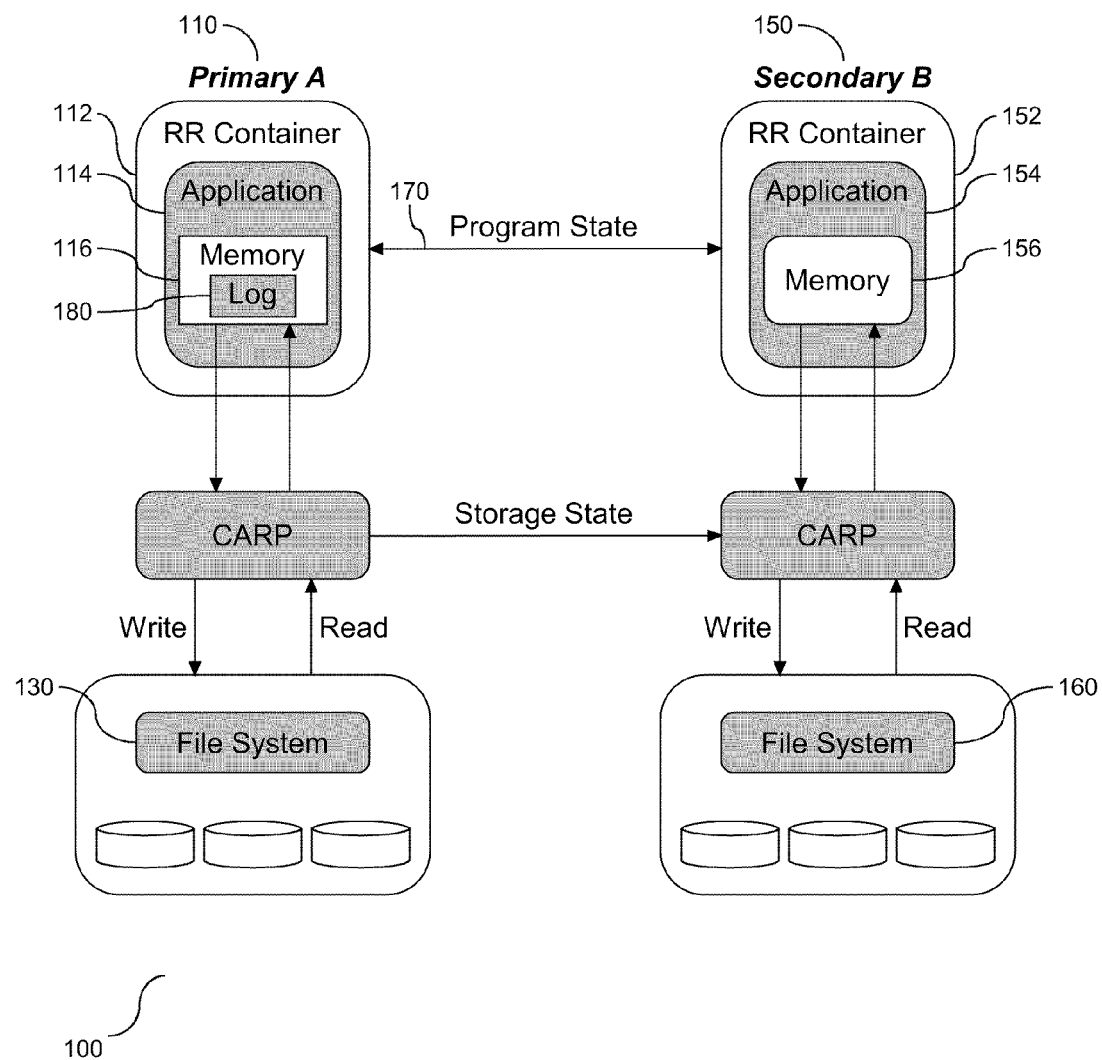
FIG. 1 is a block diagram of an architectural overview of a computer system employed for silent data error detection and resolution according to the preferred embodiment of this invention, and is suggested for printing on the first page of the issued patent.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

The functional units described in this specification have been labeled as managers and administrators. A manager and/or administrator may be implemented in programmable hardware devices such as field programmable gate arrays, programmable array logic, programmable logic devices, or the like. The manager and/or administrator may also be implemented in software for execution by various types of processors. An identified manager and/or administrator of executable code may, for instance, comprise one or more physical or logical blocks of computer instructions which may, for instance, be organized as an object, procedure, function, or other construct. Nevertheless, the executables of an identified manager and/or administrator need not be physically located together, but may comprise disparate instructions stored in different locations which, when joined logically together, comprise the manager and/or administrator and achieve the stated purpose of the manager and/or administrator.

Indeed, a manager and/or administrator of executable code could be a single instruction, or many instructions, and may even be distributed over several different code segments, among different applications, and across several memory devices. Similarly, operational data may be identified and illustrated herein within the manager and/or administrator, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of recovery managers, authentication modules, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Overview

A primary program and a secondary copy (or clone) of the program are executed on two separate hosts, with each of the programs executing within in a Record and Replay container. The primary and secondary containers exchange state information with each other to keep their executions synchronized. Henceforth, we refer to that system as "RR". RR is designed to support the recording and subsequent replay of the execution of unmodified applications running on multiprocessor systems. A key limitation of RR, as well as other existing program replication systems, is that it addresses program replication without considering the storage replication for site failures or the occurrence of silent data errors. This invention considers storage replication and in particular, extends record and replay program replication schemes to support recovery from silent data errors in a replicated program environment. In the storage replication mechanism adopted for this invention, the program and its replicas are each responsible for storage replication. The program replicas access local storage independently, and by virtue of having their executions synchronized using program replication techniques, their respective storage remains identical. Execution of the program and the clone are synchronized, and a checksum technique is employed to ensure data consistency between the program and the clone. A third copy of data pertaining to the program and the second copy is maintained and stored local to the program as a write operations log. The third copy is employed as a referee to resolve discrepancies between the data managed by the primary copy of the program and that managed by the secondary copy, found at periodic checksum exchanges.

Technical Details

In the following description of the embodiments, reference is made to the accompanying drawings that form a part hereof, and which shows by way of illustration the specific embodiment in which the invention may be practiced. It is to be understood that other embodiments may be utilized because structural changes may be made without departing form the scope of the present invention.

The program replication technique that this invention builds upon employs record and replay to support the recording and subsequent replay of the execution of unmodified applications running on multiprocessor systems. With record and replay, multiple instances of an application are simultaneously executed in separate environments. In one embodiment, each separate environment is referred to as a container. Separation of execution in containers facilitates state replication between the application instances by resolving resource conflicts and providing a uniform view of underlying operating system resources across all replicas. In general, record and replay addresses replication of relevant operating system state information including the state maintained within the kernel, such as network state to preserve network connections across failures, as well as the state resulting from non-deterministic interleaved accesses to shared memory in symmetric multiprocessing systems and the asynchronous order of writes.

The underlying record and replay system addresses each source of non-determinism visible to the application and ensures its deterministic replay. In particular, non-determinism originating in the system calls is addressed by serializing them, recording the result along with their relative order, and playing back the same result and order. One limitation of the record and replay scheme is that it addresses program replication assuming that both replicas access shared storage, and thus does not consider storage replication which is essential for handling site failures. The program replication technique disclosed herein considers storage related issues by extending record and replay to provide an integrated program and storage replication, and also provides an efficient mechanism to detect and recover from silent data errors.

An integrated storage and program replication mechanism is required in order to recover cleanly from a site failure. If an application and its associated storage both fail at the primary site, the mechanism must ensure a synchronized switch-over to a replica site, which must have a replicated copy of the program and storage synchronized with that of the primary site. Integrated storage and program replication cannot be supported by combining synchronous storage system replication or synchronous logical volume mirroring with an existing program replication scheme. With either of these storage replication schemes, the secondary (replica) node cannot mount a file system on the replica volume since it is read only and being constantly updated to reflect changes in the primary. Therefore, the secondary application's read/write operations have to be monitored and its input data supplied from the primary using the program replication channel. However, on failure of the primary node, the only recovery option is to mount the secondary's file system on the replica volume after changing it to read-write state, at which time the file system, whose content only reflects the data flushed to disk by the primary host's file system and not the contents of its buffer cache, will be oblivious of the states of the secondary application's open files. This problem can be addressed by restarting the application, but that would violate the continuous availability constraint.

FIG. 1 is a block diagram (100) of an architectural overview of a replication system. As shown, there are two hosts, a primary host (110) and a secondary host (150). The primary host (110) has a record and replay container (112), and the secondary host has a record and replay container (152). Each host has an application executing on local memory. More specifically, the primary host (110) has application (114) executing on local memory (116), and the secondary host (150) has application (154) executing on local memory (156). Each application (114), (154) is backed by a file system (130), (160), respectively, and back end storage, and the two environments are equivalent in that the file system namespaces relevant to the two applications (114) and (154) are identical. The primary application (114) and the secondary application (154) each issue system calls, e.g. open, close, read, and write, on separate files of the same name on each host, and each host's file system stores the underlying data on a separate storage system. A replication link (170) between the two containers (112) and (152) is used to exchange program state information needed for program replication, as well as I/O related information needed to handle silent data errors to ensure the deterministic execution of the second program (154) with respect to the first program (114). Because the execution of the two programs is synchronized, they issue the same updates to their respective storage systems, which thereby remain synchronized except when a silent data error occurs on one host.

The primary program (114) maintains a write operations log(180) for each file that is created or updated by the program. This log(180) serves as the third copy of each file and persists on the file system of the primary host. The log(180) is shown maintained in memory (116) during program execution for efficiency, but is written to disk periodically when the memory space has to be reclaimed, and is also written to disk when the content of the corresponding file has to be guaranteed to be written to secondary storage as a result of system calls. In one embodiment, the log(180) and the original data are stored on different disks in the first file system to reduce the probability of both copies of the data in different disks having silent data errors at the same time. Similarly, in one embodiment, the write operations log file for a data file is cached appropriately into an in-memory hash table for efficient reference.

The integrated program and storage replication mechanism addresses issues introduced by storage replication that may potentially contaminate program memory and cause the execution of program replicas to diverge. Silent data errors is one such issue that occurs whenever a read or write disk head seeks data improperly. One tool employed to detect silent data errors is check summing. More specifically, a checksum is an error-detection scheme in which each transmitted message is accompanied by a numerical value based on the number of bits in the message. The receiving station applies the same formula to the message and checks to make sure the accompanying numerical value is the same. If the numerical base value and the accompanying numerical value are not the same, there is an error caused during transmission. In the case of integrated program and storage replication, the checksum is stored independently of the data and is computed after all layers of the storage stack have completed processing the data. Recovery from silent data errors requires multiple copies of the data to identify the correct copy. In the program replication environment, recovery involves restoring not only the correct data, but also the program state that was affected by corrupt data.

One solution to resolving silent data errors with check summing includes computing the checksum on every read operation. However, this is not an efficient method of employing the checksum for silent data errors, especially since silent data errors are uncommon. A better solution is an optimized version of this approach where the checksum exchange overhead is amortized over a number of read operations. Instead of checking for a possible silent data error on every read, checksum comparison is performed periodically in one of three ways: periodic cross-container checking of read checksums, before writing data to the external environment, or after detection of the divergence of execution states between the program replicas by the RR program replication system. The event of exchanging a checksum for comparison between two containers is referred to as a checkpoint. On detection of a silent data error, the state of the program instance that used corrupt data, as well as the data itself, is no longer valid and has to be restored to the current state of the instance with valid data. Accordingly, only the state of the program that may have been exposed to corrupt data, as well as the data itself, is restored.

Figure 2:
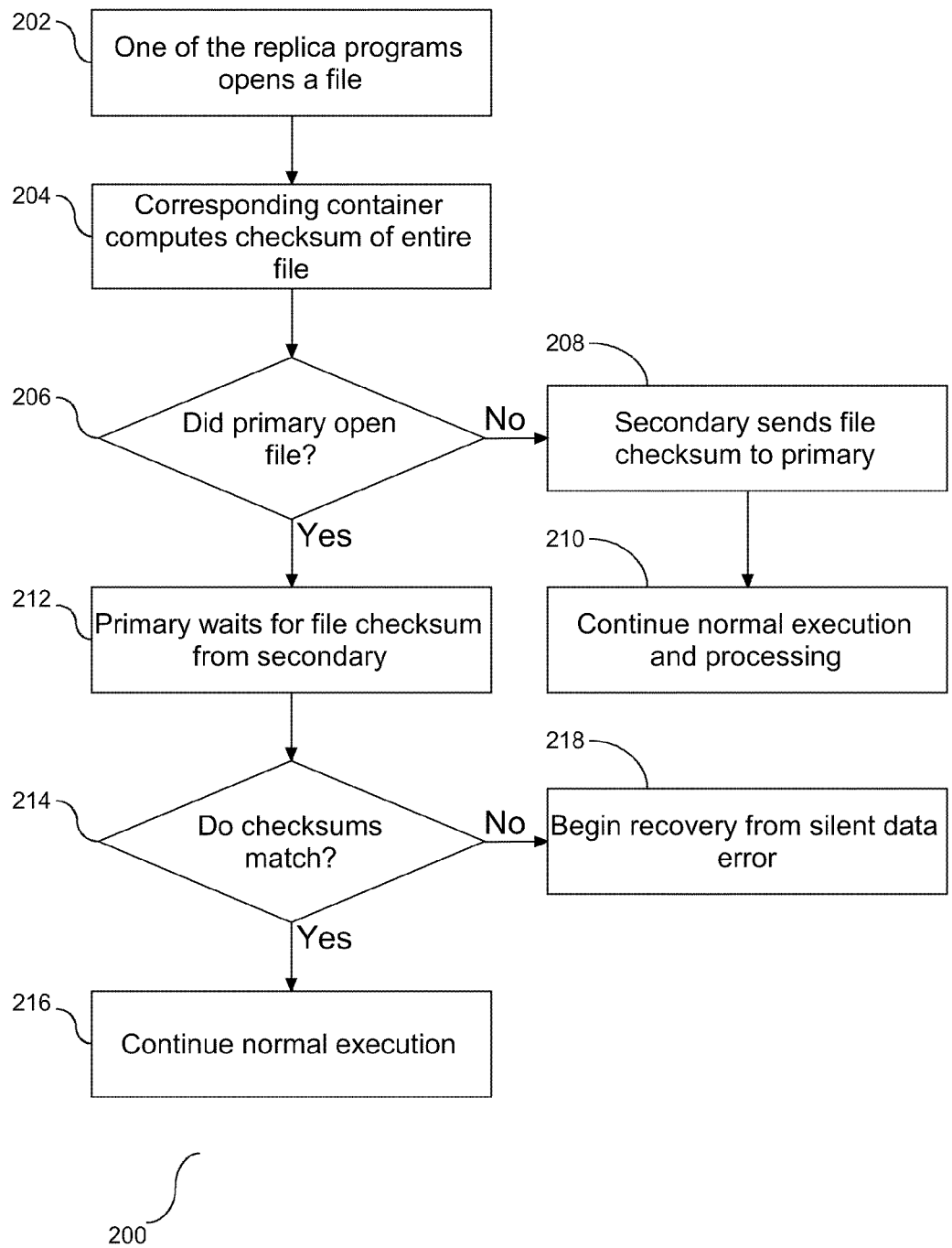
FIG. 2 is a flow chart illustrating initialization when a file is opened by an application.

For each execution cycle, the initial condition that must be ensured is that the contents of all existing files to be accessed by the programs in the separate container are identical and error free. FIG. 2 is a flow chart (200) illustrating the program for performing an initialization check when a file is opened by an application. A program is running on each container, wherein the programs are replicas with one playing the role of primary and the other the role of secondary, e.g. the replica. Each program maintains a set of in-memory state variables. The running-read-checksum variable serves as a unique signature of all data read by the program since the previous mark referred to herein as a checkpoint, and since the start of the program if no checkpoint has been performed yet. This variable is updated continuously after every read request.

As shown herein, one of the replica programs on one of the containers opens a file (202). The corresponding container computes the checksum for the entire file (204). The subsequent action taken by the container depends on the role of the program which opened the file, namely whether it is the primary or the secondary (206). If the secondary container opened the file at step (202), then the secondary container sends the file checksum to the primary container (208), followed by the secondary container proceeding with normal execution and processing (210). Conversely, if the primary container opened the file at step (202), then the primary container waits to receive the file checksum from the secondary container (212). Upon receipt of the checksum from the secondary container, the primary container determines if the checksums of the primary and secondary containers match (214). A positive response to the determination at step (214) is an indication that no silent data error exists for this file when it was opened by both copies, and the program copies continue with normal execution (216). Conversely, a negative response to the determination at step (214) is an indication that there is a silent data error associated with this file in one site, and recovery from the error must begin (218).

Figure 3:
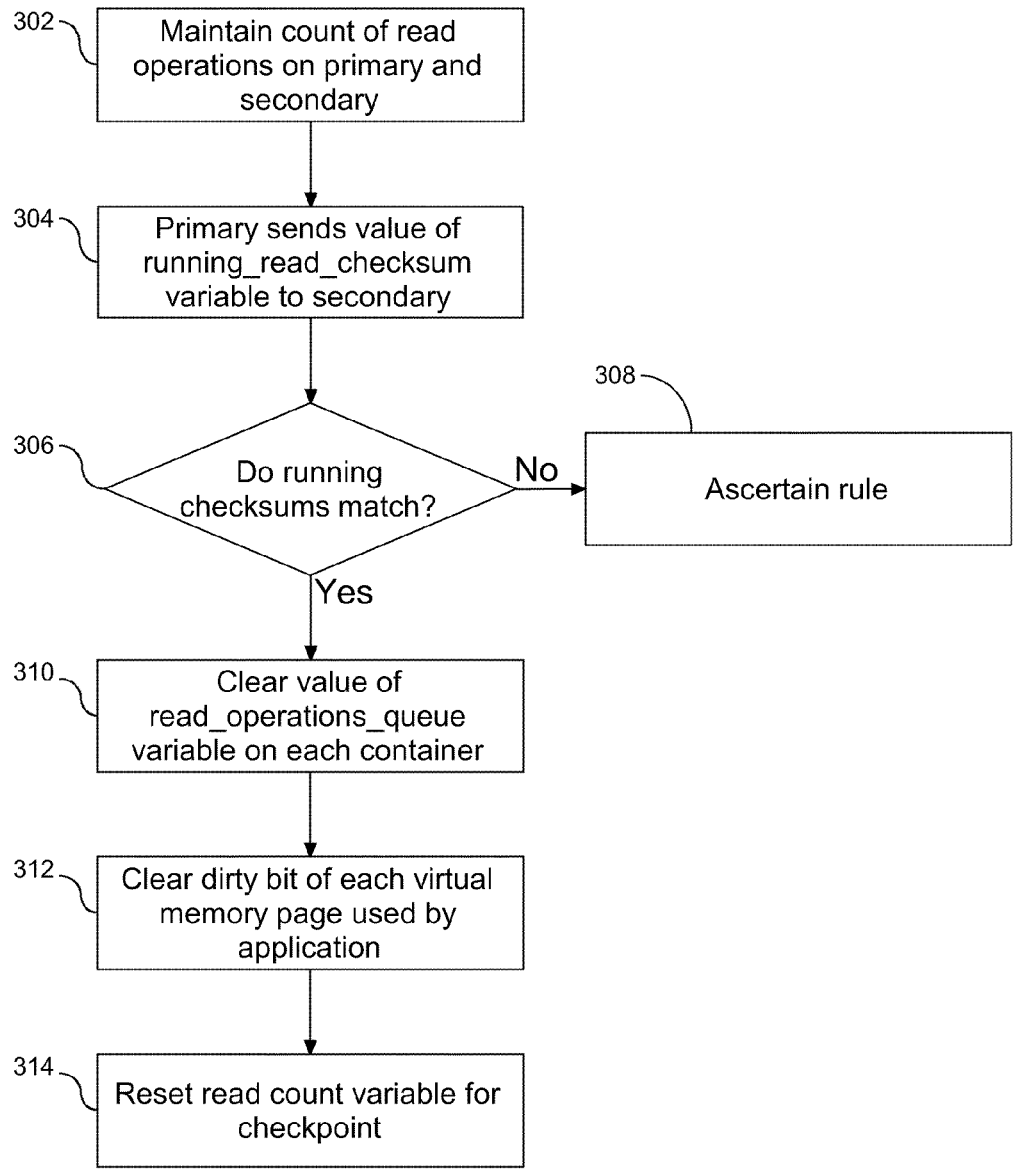
FIG. 3 is a flow chart illustrating initialization after each checkpoint on the primary and secondary hosts.

The running_read_checksum variable is updated continuously after every read request. The read_operations_queue variable keeps track of the set of read operations on all files performed by the program instance since the previous checkpoint or program start. FIG. 3 is a flow chart (300) illustrating a process for initialization of these variables after each checkpoint. A count of the quantity of read operations on the primary and secondary programs is maintained (302) by each container. The primary program periodically sends the value of the running_read_checksum variables to the secondary program (304), along with the read_count. Following the exchange at step (304), it is determined if the comparison of the running_read_checksum values of the primary and secondary hosts are equal (306). A negative response to the determination at step (306) is an indication of a checksum error and the primary host initiates recovery from the checksum error (308), as described in details with reference to FIGS. 7A and 7B. The error can be present on either host. In one embodiment, the primary host is responsible for driving recovery. However, the invention should not be limited to this scenario, as in another embodiment the secondary host may be responsible for driving recovery. A positive response to the determination at step (306) is an indication that there is no silent data error present. The read_operations_queue variable on both the primary and second hosts is cleared (310), followed by a clearing of the dirty bit of each virtual memory page used by the respective applications (312). Finally, the read_count variable in each container is reset so that the checksums may be evaluated in the future at the next checkpoint (314).

The read and write processing phases are executed on each program instance during the processing of each read and write system call. Every read and write system call issued by the program instance, with arguments including the file, offset, and length, is intercepted by the corresponding container. In case a read or write is done through a memory map, the processing phases are conducted when the respective pages are read or written from the storage by instrumenting the kernel buffer cache. For efficient checksum computation and storage space usage, the data checksum may be calculated at a page level, where the size of the page is predefined (e.g., 4 Kilobytes). However, the invention should not be limited to this embodiment, as in another embodiment, the data checksum may be calculated at the whole file or data block level. For both read and write operations, all pages of a configured size of file data that completely contain the region of data being read or written are accessed. If the operation is targeted at the end of the file such that the last page boundary in the file contains less than a page of data, then only the partial page is accessed.

Figure 4A:
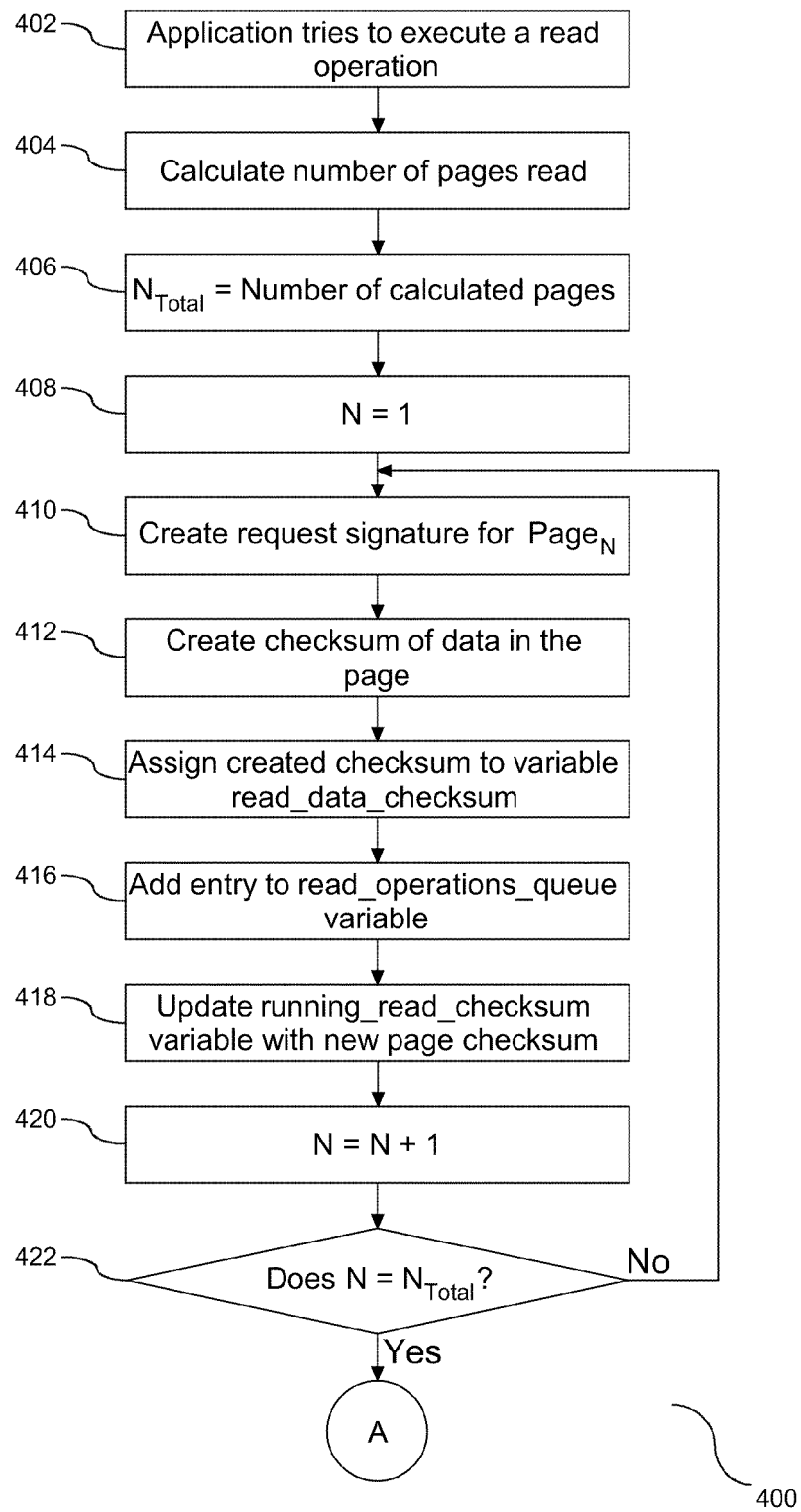
FIGS. 4A and 4B are a flow chart illustrating the processing of a read operation on the primary or secondary host.
Figure 4B:
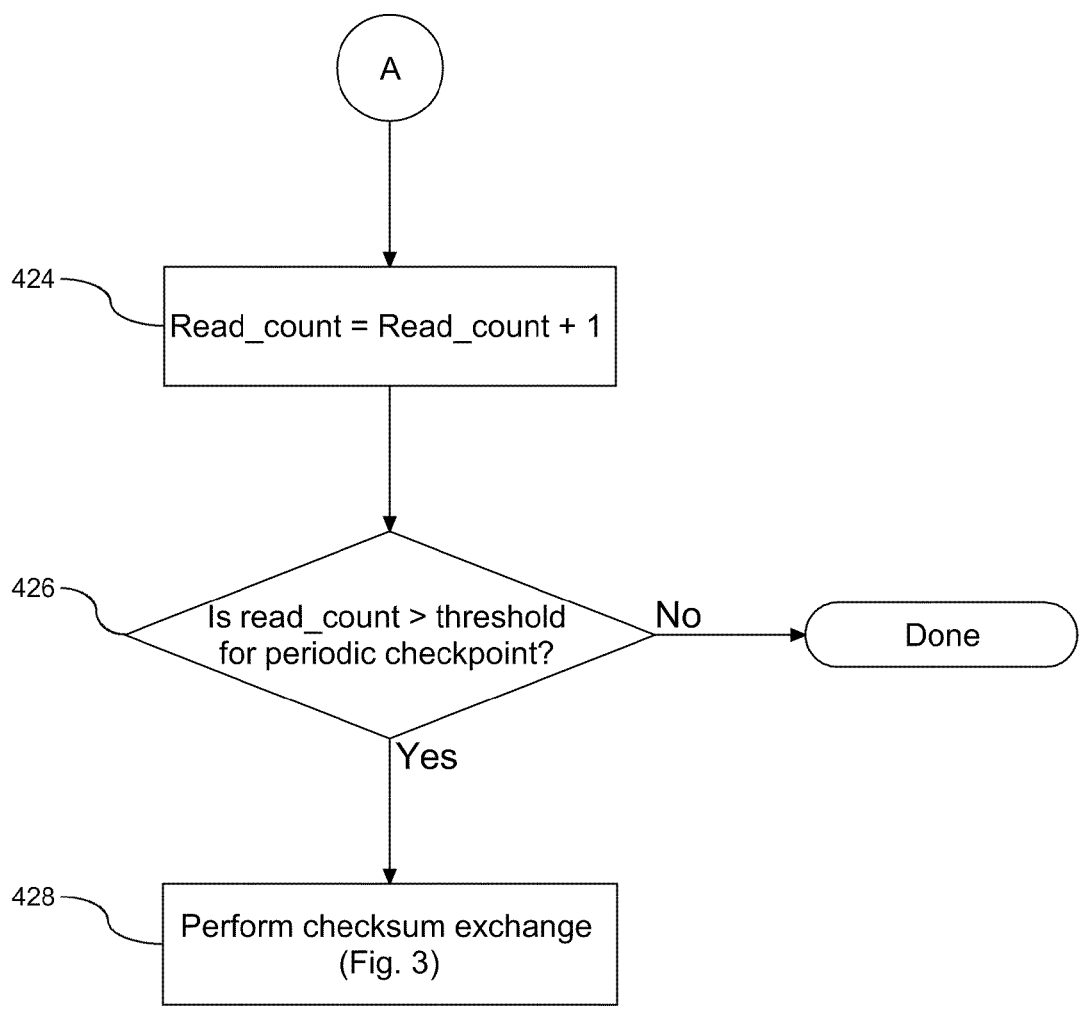

Read processing involves computing the signature of the request and the checksum of the actual data read. For every file page accessed, a new read operations queue entry is created to record a tuple including the request signature and read data checksum. The request signature is the tuple <file, page number, length>. FIGS. 4A and 4B are a flow chart (400) illustrating the processing of a read operation processing by the container, which is performed each time a read operation is executed by either the primary or secondary application. Initially, an application tries to execute a read operation within its container (402). In one embodiment, the container is a software layer that processes transactions within the layer without employing the operating system layer. In response to the transaction at step (402), the number of pages read in the transactions is calculated (404). The variable $N_{Total}$ is assigned to the calculated number of pages (406), and a counting variable N is assigned to the integer one (408). For each page N that was read in the transaction, a request signature is created (410). In one embodiment, the request signature includes the file, page number, and length. A checksum of data in the page is created (412), and it is assigned to the variable read_data_checksum (414). Thereafter, an entry is added to the read operation queue variable for the page read (416). In one embodiment, the entry in the queue includes the read request signature together with the read data checksum. Next, the running_read_checksum variable is updated with the value of the new page checksum (418). If there are more pages in the range of data being read (420, 422), then control returns to step (410). If there are no more pages, then the basic processing for the read operation ends, followed by the containers checking if it is time for the periodic exchange of the running_read_checksum variable values to see if any silent data error has been encountered.

In step (424), the read_count variable is incremented by the integer 1, and it is determined if the value exceeds a threshold for a periodic checkpoint (426). In one embodiment, the threshold may be statically configured, or in an alternate embodiment, the threshold may be dynamically determined. For example, a statically configured factor may include an administrator setting a defined quantity of read operations after which checksums are compared, and a dynamically determined factor may include the primary container in communication with the primary copy of the program increasing a threshold of a number of read operations after which checksums are compared if no silent data errors are seen and then reducing that threshold once a silent data error is detected. Regardless of the classification of the threshold factor, a positive response to the determination at step (426) is followed by an exchange of the checksums (428), as shown in detail in FIG. 3. Conversely, a negative response to the determination at step (426) concludes the read operation processing.

Figure 5:
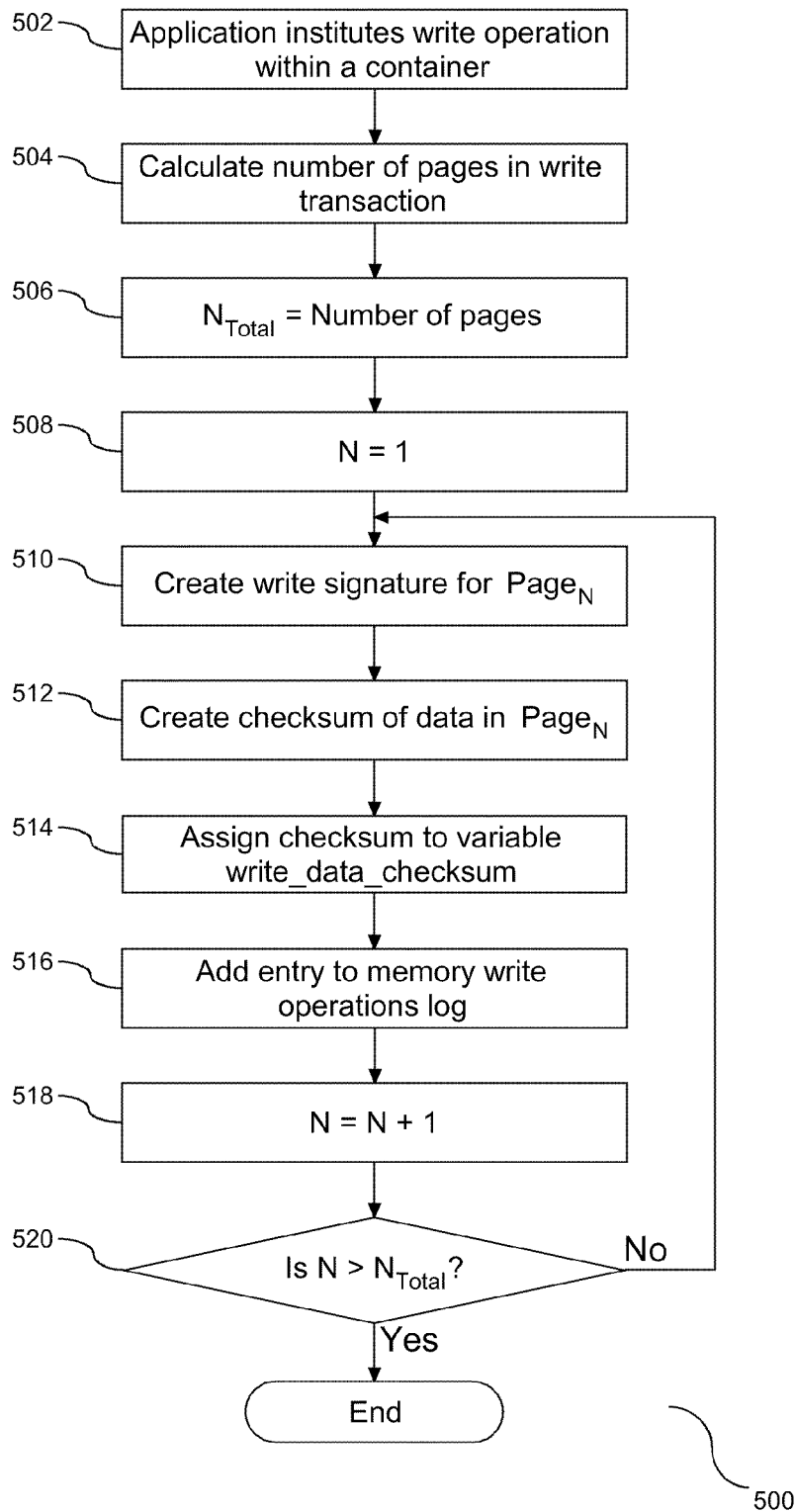
FIG. 5 is a flow chart illustrating the processing of a write operation on the primary host.

Similar to the read processing, write processing involves maintaining a log record retainer local to the primary copy. The write processing is performed only on the primary host, wherein the write operations log is updated with an entry per page. FIG. 5 is a flow chart (500) illustrating a write operation processing by the container, which is performed each time a write operation is executed by the application on the primary host. Initially, an application institutes a write operation within a container (502). In response to the transaction at step (502), the number of pages in the transaction is calculated (504). The variable $N_{Total}$ is assigned to the calculated number of pages (506), and a counting variable N is assigned to the integer one (508). For each page N that was read in the transaction, a write request signature is created (510). In one embodiment, the write request signature includes the file, page number, and length. A checksum of data in the page is created (512), and it is assigned to the variable write_data_checksum (514). Thereafter, an entry is added to the in memory write operations log for this file for the page written <write request signature, write_data_checksum> (516). The entry at step (516) is the third copy that is retained in the write log local to the primary host.

Following step (516), the counting variable N is incremented (518) and it is determined if all of the write operations have been added to the third copy record log(520). A positive response to the determination at step (520) concludes the processing, and a negative response to the determination at step (520) is followed by a return to step (510).

The checksum comparison of FIG. 3 is also invoked before external data is exposed to the environment, and also when the Record and Replay program replication system detects divergence of program execution paths, most probably because of a silent data error resulting in conditional execution of one of the copies taking a different branch of execution, such as in an IF-statement.

Figure 6:
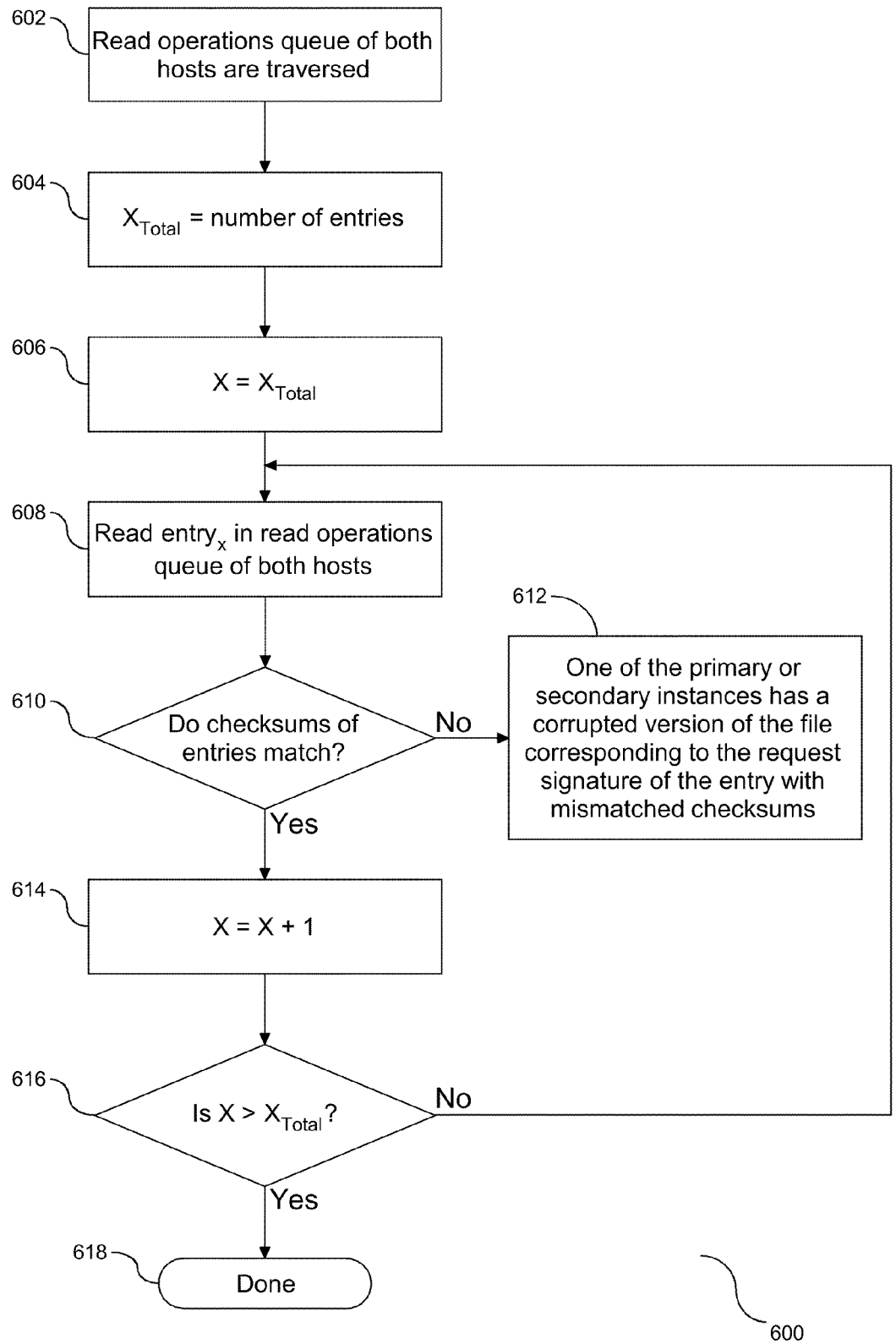
FIG. 6 is a flow chart illustrating identification of the file with a silent data error.

As shown in FIGS. 4 and 5, there are two processes employed to periodically evaluate data for a silent data error. One process is employed for read operations, see FIGS. 4A and 4B, and another process employed for write operations, see FIG. 5. A recovery process is limited to detection of a checksum error. More specifically, the recovery phase is invoked when a silent data error is detected, as demonstrated in FIG. 3, implying the presence of corrupted data in one of the two systems. To determine which file has correct data, the third copy record log is used as a tie-breaker. The write operations log serves as the source of checksums of the data file content, and is used to determine the correct version of the data file to use to replace the corrupted file. FIG. 6 is a flow chart (600) illustrating a process for determining which file on a host is corrupted due to a silent data error. In one embodiment, the file determination process is driven by the primary host as the recovery log is local to the primary host. The read operations queues of both hosts are traversed (602). The variable $X_{Total}$ is assigned to the number of entries in each of the read operations queue of both the primary and secondary hosts (604), and a counting variable X is assigned the value of $X_{Total}$ (606). For each container, the data checksum value of entry$_X$ is read (608), followed by a comparison of entry$_X$ of the primary with that of the secondary to determine if the checksums of the entries match (610). In one embodiment, the primary and secondary should have the same request signature since the execution of the two programs is synchronized. A negative response to the determination at step (610) indicates that the checksums do not match, and that one of the primary or secondary instances has corrupted version of the file identified by the request signature (612). Conversely, a positive response to the determination at step (610) is followed by a decrement of the counting variable (614) and a test to determine if there are any more entries in the read operations queues (616). If it is determined that there are more entries in the queues, then the process returns to step (608) for evaluation of the next subject queue entry. Conversely, a positive response to the determination at step (616) concludes the queue evaluation process (618). In one embodiment, a checksum mismatch will have been discovered; otherwise the system would not be in the recovery process.

Figure 7A:
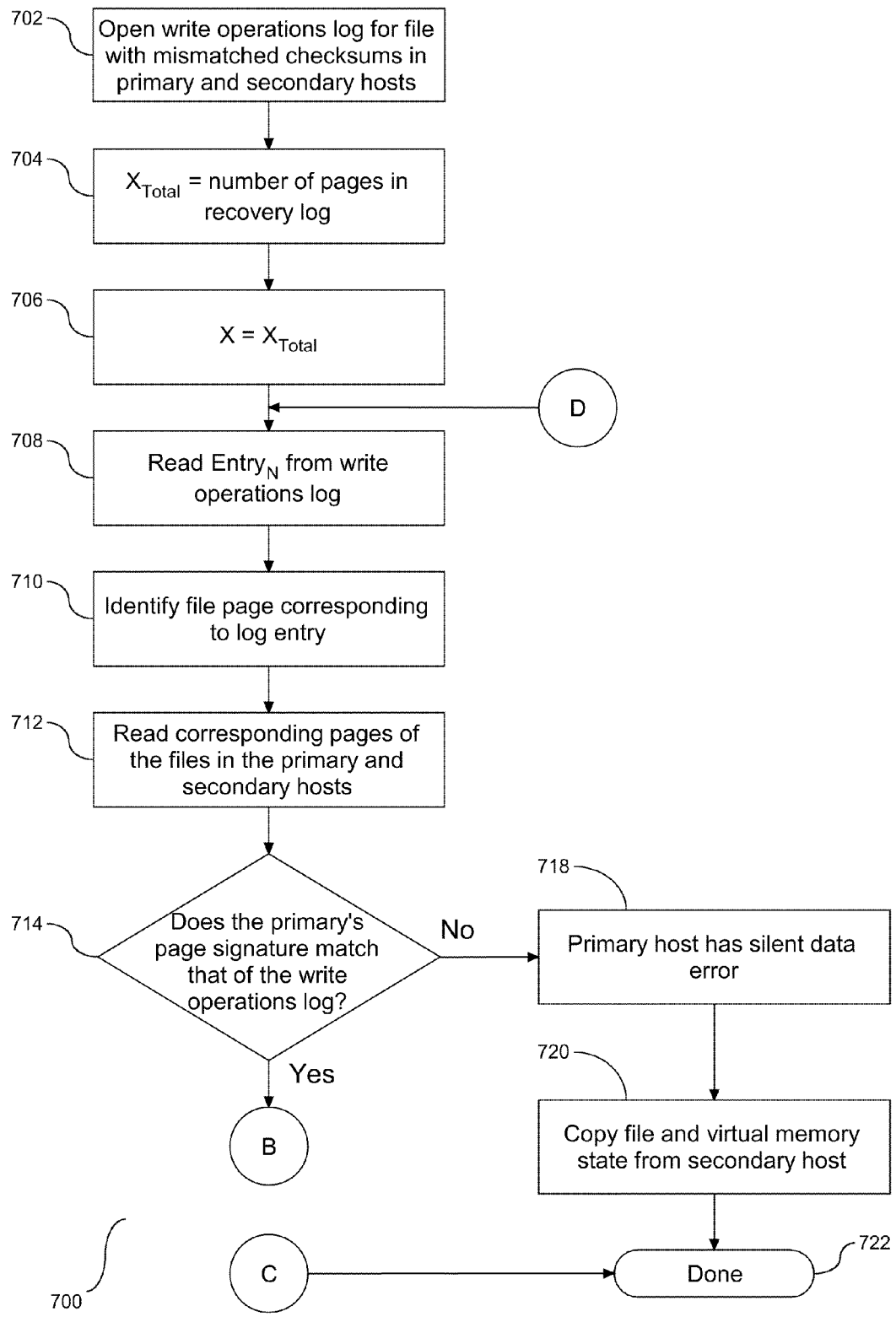
FIGS. 7A and 7B are a flow chart illustrating a process for recovery of the file with a silent data error as well as the memory state of that host.
Figure 7B:
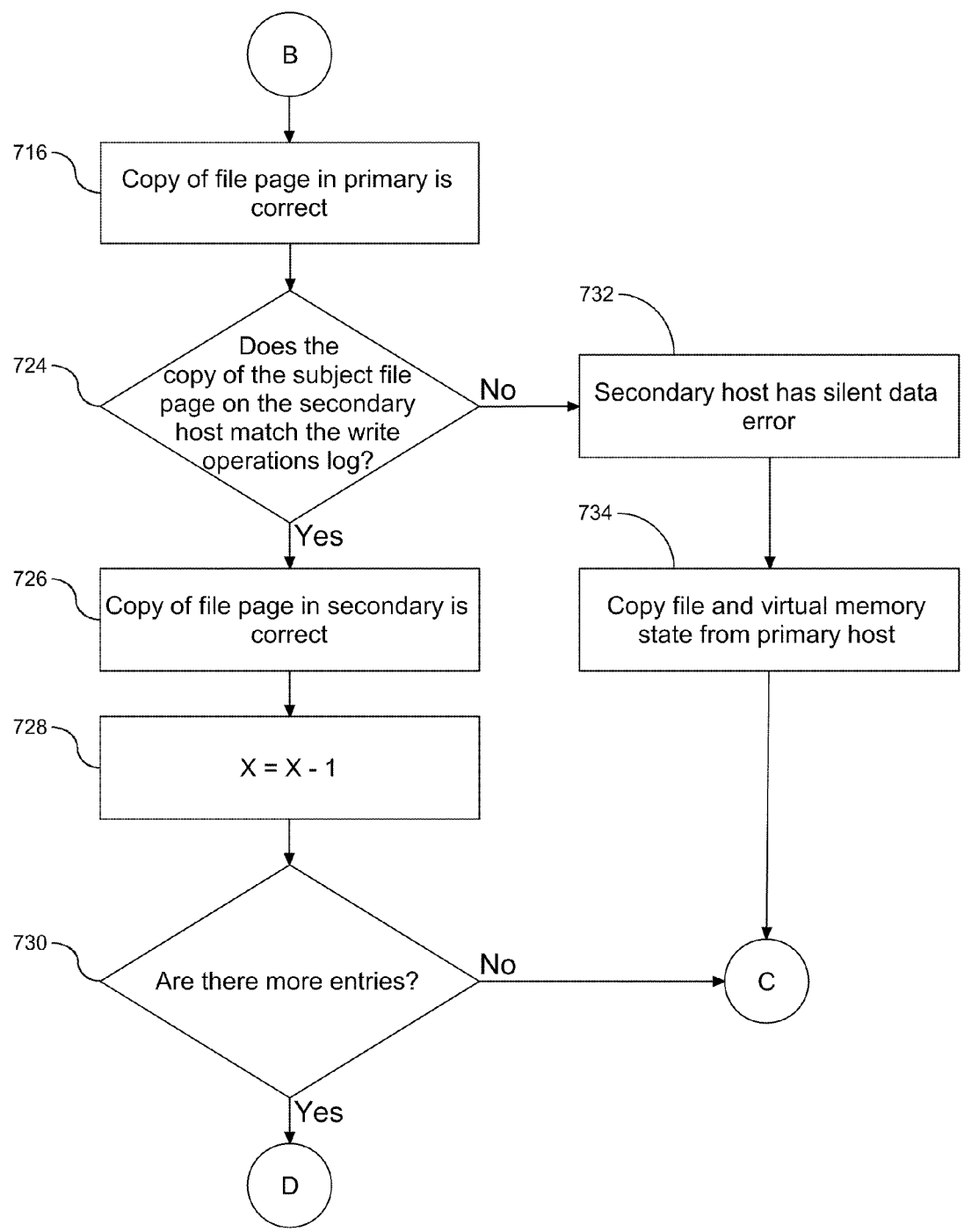

Only one of the primary or secondary instances is known to have the correct version of the file identified by the flow chart of FIG. 6. FIGS. 7A and 7B are a flow chart (700) illustrating a process for determining which of the instances has the correct file, and for restoring the corrupt file and program execution state of the application with incorrect file content. The write operations log for the file with the mismatched checksums from the primary and secondary hosts is opened (702). The variable $X_{Total}$ is assigned to the number of pages in the recovery log(704), and the counting variable X is assigned to the variable $X_{Total}$ (706). In one embodiment, the review of the record log starts from the end of the log and proceeds backwards to the beginning of the log as it is desirable to seek the most recent entry in the log with the error. Entry$_X$ from the write operations log is read (708), and the file page associated with the log entry is identified (710). Once the file page (number) is identified, the corresponding page(s) of that file in both the primary and secondary hosts is read (712). It is then determined if the copy of the subject file page on the primary host matches that of the write operations log(714). A positive response to the determination at step (714) is followed by an affirmation that the copy of the subject page on the primary host is correct (716). Conversely, a negative response to the determination at step (714) is conclusive that the copy of the subject page on the primary host contains the file with the silent data error (718). Both the file and the virtual memory state are copied form the secondary host to the primary host (720), and the process concludes (722).

However, if at step (714) it is determined that the subject page from the primary host does not contain an error, it is then determined if the copy of the subject file page on the secondary host matches that of the write operations log(724). A positive response to the determination at step (714) is followed by an affirmation that the copy of the subject page on the secondary host is correct (726). Conversely, a negative response to the determination at step (724) is conclusive that the copy of the subject page on the secondary host contains the file with the silent data error (732). Both the file and the virtual memory state are copied from the primary host to the secondary host (734), and the process concludes (722).

The processes outlined above address finding the silent data error on either the primary or secondary host based upon an entry in the write operations log. Following step (726), the counting variable X is decreased (728). It is then determined if there are any more entries in the write operations log(730). A positive response to the determination at step (730) is followed by a return to step (708). Conversely, a negative response to the determination at step (730) is followed by a return to step (722) to conclude the recovery process. Accordingly, entries in the write operations log are reviewed starting with the most current entries and proceeding to older entries, to determine the location of the silent data error and to perform a recovery thereof.

Embodiments within the scope of the present invention also include articles of manufacture comprising program storage means having encoded therein program code. Such program storage means can be any available media which can be accessed by a general purpose or special purpose computer. By way of example, and not limitation, such program storage means can include RAM, ROM, EEPROM, CD-ROM, or other optical disk storage, magnetic disk storage or other magnetic storage devices, or any other medium which can be used to store the desired program code means and which can be accessed by a general purpose or special purpose computer. Combinations of the above should also be included in the scope of the program storage means.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, random access memory (RAM), read-only memory (ROM), a rigid magnetic disk, and an optical disk. Current examples of optical disks include compact disk B read only (CD-ROM), compact disk B read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks.

The software implementation can take the form of a computer program product accessible from a computer-useable or computer-readable medium providing program code for use by or in connection with a computer or any instruction execution system. In one embodiment, a manager is provided to synchronize the primary copy with the secondary copy. The manager computes a first checksum of data on the primary host in response to a read operation local to the primary host, computes a second checksum of data on the second host in response to a read operation local to the second host, periodically communicate the first checksum to the second host, and resolves any discrepancies between the first and second checksum of data indicative of a silent data error. In addition the manager detects incorrect content in at least one of the copies due to the silent data error and recovers from a detected error by correction of the incorrect content to resolve the discrepancy. The manager may be embodied in a hardware element of the system, as a software element embodied in the form of computer readable instructions executed by a processor, or a combination of hardware and software elements.

Advantages

The silent data error resolution is a transparent low-overhead integrated program and storage replication solution that provides efficient detection and recovery from silent data errors. The basic container concept is extended to address storage replication and silent data error detection and recovery. Checkpoints are established to enable periodic review of checksums, and mitigate the quantity of checksum evaluations and exchanges in the system.

Alternative Embodiments

It will be appreciated that, although specific embodiments of the invention have been described herein for purposes of illustration, various modifications may be made without departing from the spirit and scope of the invention. In particular, the copying of virtual memory state in steps (720) or (730) has to be efficient, since copying of the entire virtual memory state from the correct program copy to the one with the corrupted memory state due to the silent data error in a file can be quite expensive for an application with a large memory footprint. In one embodiment, virtual memory that has been modified is tracked, and during a checkpoint, if a silent data error is detected, only the modified virtual memory pages are copied from the correct copy of the application to the instance with the error. Several methods of virtual memory tracking can be used. In one embodiment, the employed method is based on intercepting page faults. At the beginning of a checkpoint, each container changes the access control setting on all virtual memory pages of the program to READ ONLY. During normal program execution, each update to a new virtual memory page by the program results in an access control type of page fault. Upon detection of the page fault, the container's trap handler modifies the page permissions to READ WRITE and adds the page address to the dirty pages list for error recovery purposes. In another embodiment, the employed method for addressing this problem uses a page table scanning method, where the dirty bit in the page table is used to identify the virtual memory pages modified by the application in between checkpoints. At the start of a checkpoint, the container clears all the dirty bits of pages in the application's memory space. When the program modifies a virtual memory page, the hardware automatically marks the dirty bit for that page in the page table. Once a silent data error is detected on a checksum mismatch, the container scans the page table of the application's memory space to find the dirty pages since the last checkpoint, and only those pages are copied from the clean instance to the one with the error. Accordingly, the scope of protection of this invention is limited only by the following claims and their equivalents.

We claim:

1. A method for resolving a silent data error, comprising:
running a primary copy of a program on a primary host;
running a secondary copy of the program on a secondary host;
the primary copy of the program; reading and writing data to a primary storage device;
the secondary copy reading and writing data to a secondary storage device;
the primary copy and the secondary copy communicating to maintain synchronized execution of the copies;
a write data log, including a checksum for each modified page, stored on the primary storage device and maintained in memory on the primary host while the program is running;
synchronizing the primary copy with the secondary copy, including:
computing a first checksum of a data page on the primary host in response to a read operation local to the primary host;

computing a second checksum of the data page on the secondary host in response to a read operation local to the secondary host; and periodically communicating the first checksum to the secondary host including comparing the first and second checksum of data after a defined quantity of read operations greater than one, and resolving any discrepancies between the first and second checksum of data reflecting a silent data error including detecting incorrect content in at least one of the copies due to the silent data error using the checksum of the data page in the write data log.

2. The method of claim 1, further comprising recovering from a detected error by correcting the incorrect content to resolve the discrepancy.

3. The method of claim 1, wherein resolving discrepancies between checksum data includes a periodic cross container checking of read checksums before writing data to an external environment.

4. The method of claim 1, wherein resolving discrepancies between checksum data includes a periodic cross container checking of read checksums after detecting divergence of execution states between program replicas by a program replication system.

5. The method of claim 1, further comprising employing a checksum comparison factor of an administrator setting a defined quantity of read operations after which checksums are compared.

6. The method of claim 1, further comprising employing a checksum comparison factor of a primary container in communication with the primary copy of the program increasing a threshold of a number of read operations after which checksums are compared if no silent data errors are seen and then reducing that threshold once a silent data error is detected.

7. The method of claim 1, further comprising recovering the detected error from a silent data error, including setting attributes of virtual memory pages of the program after each checkpoint and changing the access control of each page to read only.

8. The method of claim 1, further comprising recovering the detected error from a silent data error, including setting attributes of virtual memory pages of the program after each checkpoint and clearing a dirty bit in a corresponding page table.

9. A system for resolving a silent data error, comprising:
a primary processor to execute a primary copy of a program;
a secondary processor to execute a secondary copy of the program;
the primary copy of the program to read and write data to a primary storage device, and the secondary copy to read and write data to a secondary storage device, wherein the primary copy and the secondary copy maintain synchronized execution of the copies;
a write data log to correct a silent data error, the write data log, including a checksum for each modified page, stored on the primary storage device and maintained in memory in communication with the primary processor; and
a manager to synchronize the primary copy with the secondary copy, wherein the manager is configured to: compute a first checksum of a data page in response to a read operation in communication with the primary processor, compute a second checksum of the data page in response to a read operation in communication with the secondary processor, to periodically communicate the first checksum to the secondary processor including comparing the first and second checksum of data after a defined quantity of read operations greater than one, and to resolve any discrepancies between the first and second checksum of data indicative of a silent data error including detecting incorrect content in at least one of the copies due to the silent data error using the checksum of the data page in the write data log.

10. The system of claim 9, further comprising the manager to recover from a detected error by correction of the incorrect content to resolve the discrepancy.

11. The system of claim 9, wherein the manager performs a periodic cross container checking of read checksums, before writing data to an external environment to resolve discrepancies between checksum data.

12. The system of claim 9, wherein the manager resolves discrepancies between checksum data after detecting divergence of execution states between program replicas by a program replication system.

13. The system of claim 11, further comprising an administrator in communication with the manager to set the defined quantity of read operations after which checksums are compared.

14. The system of claim 11, further comprising an administrator in communication with the manager, the administrator to employ a checksum comparison factor of a primary container in communication with the primary copy of the program to increase a threshold of a number of read operations after which checksums are compared if no silent data errors are seen and then reducing that threshold once a silent data error is detected.

15. The system of claim 11, wherein the manager sets attributes of virtual memory pages of the program after each checkpoint to recover the detected error.

16. The system of claim 15, wherein the attributes change the access control of each page to read only.

17. The system of claim 15, wherein the attributes clear a dirty bit in a corresponding page table.

18. An article for resolving a silent data error comprising:
a primary copy of a program running on a primary processor;
a secondary copy of the program running on a second processor;
the primary copy of the program, reading and writing data to a primary storage device;
the secondary copy reading and writing data to a secondary storage device;
the primary copy and the secondary copy communicating to maintain synchronized execution of the copies;
a data write log, including a checksum for each modified page, stored on the primary storage device and maintained in memory in communication with the primary processor while the program is running; and
a computer readable carrier including computer program instructions configured to synchronize the primary copy with the secondary copy, the instructions comprising:
instructions to compute a first checksum of a data page in communication with the primary processor in response to a read operation in communication with the primary processor;
instructions to compute a second checksum of the data page in communication with the secondary processor in response to a read operation in communication with the secondary processor; and
instructions to periodically communicate the first checksum to the secondary processor including comparing the first and second checksum of data after a defined quantity of read operations greater than one, and to resolve any discrepancies between the first and second checksum of data reflecting a silent data error including instructions to detect incorrect content in at least one of the copies due to the silent data error using the checksum of the data page in the write data log.

19. article of claim 18, further comprising correction of the incorrect content to resolve the discrepancy.

20. The article of claim 18, wherein the instructions to resolve discrepancies between checksum data is performed in a manner selected from the group consisting of: a periodic cross container checking of read checksums, before writing data to an external environment, and after detecting divergence of execution states between program replicas by a program replication system.

21. The article of claim 18, further comprising instructions to employ a checksum comparison factor selected from the group consisting of: an administrator setting the defined quantity of read operations after which checksums are compared, and a primary container in communication with the primary copy of the program increasing a threshold of a number of read operations after which checksums are compared if no silent data errors are seen and then reducing that threshold once a silent data error is detected.

22. The article of claim 19, wherein the instructions to synchronize the primary copy with the secondary copy includes, setting attributes of virtual memory pages of the program after each checkpoint the attributes selected from the group consisting of: changing the access control of each page to read only, and clearing a dirty bit in a corresponding page table.

* * * * *